United States Patent
Piatetsky et al.

(10) Patent No.: US 6,963,947 B2
(45) Date of Patent: Nov. 8, 2005

(54) DRIVER SUPPORTING BRIDGE METHOD AND APPARATUS

(75) Inventors: Alexei Piatetsky, Reichertsheim (DE); Frank W. Ahern, Scottsdale, AZ (US)

(73) Assignee: TAO Logic Systems LLC, Las Vegas, NV (US)

(*) Notice: Subject to any disclaimer, the term of this patent is extended or adjusted under 35 U.S.C. 154(b) by 307 days.

(21) Appl. No.: 09/908,255

(22) Filed: Jul. 18, 2001

(65) Prior Publication Data

US 2002/0169918 A1 Nov. 14, 2002

Related U.S. Application Data

(60) Provisional application No. 60/289,456, filed on May 8, 2001.

(51) Int. Cl.⁷ .................................. G06F 13/00
(52) U.S. Cl. ........................ 710/311; 710/104
(58) Field of Search ................... 710/104, 302, 710/303, 304, 306, 309, 310, 311, 312, 314

(56) References Cited

U.S. PATENT DOCUMENTS

| | | | | |
|---|---|---|---|---|
| 5,006,981 A | * | 4/1991 | Beltz et al. | 710/305 |
| 5,191,657 A | * | 3/1993 | Ludwig et al. | 710/105 |
| 5,335,329 A | * | 8/1994 | Cox et al. | 710/301 |
| 5,524,252 A | * | 6/1996 | Desai et al. | 375/222 |
| 5,548,730 A | * | 8/1996 | Young et al. | 710/100 |
| 5,694,556 A | * | 12/1997 | Neal et al. | 710/310 |
| 5,809,329 A | * | 9/1998 | Lichtman et al. | 710/8 |
| 5,894,563 A | * | 4/1999 | Saperstein | 710/305 |
| 6,070,214 A | * | 5/2000 | Ahern | 710/315 |
| 6,094,699 A | * | 7/2000 | Surugucchi et al. | 710/314 |
| 6,154,798 A | * | 11/2000 | Lin et al. | 710/72 |
| 6,189,050 B1 | * | 2/2001 | Sakarda | 710/18 |
| 6,189,063 B1 | * | 2/2001 | Rekeita et al. | 710/311 |
| 6,397,284 B1 | * | 5/2002 | Sleeman et al. | 710/266 |
| 6,484,226 B1 | * | 11/2002 | Wallach et al. | 710/302 |
| 6,594,721 B1 | * | 7/2003 | Sakarda et al. | 710/304 |
| 6,636,904 B2 | * | 10/2003 | Fry et al. | 710/8 |

OTHER PUBLICATIONS

"PCI Multi–level Rebalance in Windows Longhorn" White Paper, Microsoft Corporation, Noveber 25, 2003.*

* cited by examiner

Primary Examiner—Glenn A. Auve
(74) Attorney, Agent, or Firm—Jackson Walker L.L.P.; Robert C. Klinger (57) ABSTRACT

A methodology by which a host computer can dynamically rebalance PCI-to-PCI bridges to overcome Operating System/BIOS and Chipset limitations in order to allow multiple level PCI buses. This methodology also allows hot-swappable PCI buses to be added and removed without failure. Additionally this method allows for proper I/O resource allocation where previously alliasing preventing this. The present invention overcomes the limitations of an Operating System, such as Windows 2000 and Windows XP, to allow a PCI bus segment to be added by rebalancing the PCI bus tree and resource requirements as needed in order to fit the new PCI bus segment.

12 Claims, 7 Drawing Sheets

DRIVER SUPPORTING BRIDGE METHOD AND APPARATUS

This application claims the benefit of Provisional application Ser. No. 60/289,456, filed May 8, 2001.

FIELD OF THE INVENTION

The present invention is generally related to bus extension through bridges such as those adapted to communicate between a computer having a first bus and a second bus supporting a set of peripherals, and more particularly to PCI-to-PCI and CardBus-to-PCI bridges whereby the computer bus may be adapted to support bus chipsets and Operating Systems that do not correctly handle multi-level bridge hierarchies or hot swappable buses.

BACKGROUND OF THE INVENTION

Computers have buses to transfer data between a host processor and various devices, such as memory devices and input/output devices. As used herein an "input/output" device is a device that either generates an input or receives an output (or does both). Thus "input/output" is used in the disjunctive. These buses may be arranged in a hierarchy with the host processor connected to a high level bus reserved for exchanging the data most urgently needed by the processor. Lower level buses may connect to devices having a lower priority.

Other reasons exist for providing separate buses. Placing an excessive number of devices on one bus produce high loading. Such loading makes a bus difficult to drive because of the power needed and the delays caused by signaling so many devices. Also, some devices on a bus may periodically act as a master and request control over a bus in order to communicate with a slave device. By segregating some devices on a separate bus, master devices can communicate with other devices on the lower level bus without tying up the bus used by the host processor or other masters.

The PCI bus standard is specified by the PCI Special Interest Group of Hillsboro, Oreg. The PCI bus features a 32-bit wide, multiplexed address-data (AD) bus portion, and can be expanded to a 64-bit wide AD bus portion. Maintaining a high data throughput rate (e.g., a 33 MHZ clock rate) on the PCI bus leads to a fixed limitation on the number of electrical AC and DC loads on the bus. Speed considerations also limit the physical length of the bus and the capacitance that can be placed on the bus by the loads, while future PCI bus rates (e.g., 66 MHZ and higher) will exacerbate the electrical load and capacitance concerns. Failure to observe these load restrictions can cause propagation delays and unsynchronized operation between bus devices.

To circumvent these loading restrictions, the PCI bus standard specifies a bridge to allow a primary PCI bus to communicate with a secondary PCI bus through such a bridge. Additional loads may be placed on the secondary bus without increasing the loading on the primary bus. For bridges of various types see U.S. Pat. Nos. 5,548,730 and 5,694,556.

The PCI bridge observes a hierarchy that allows an initiator or bus master on either bus to complete a transaction with a target on the other bus. As used herein, hierarchy refers to a system for which the concept of a higher or lower level has meaning. For example, a PCI bus system is hierarchical on several scores. An ordering of levels is observed in that a high-level host processor normally communicates from a higher level bus through a bridge to a lower level bus. An ordering of levels is also observed in that buses at equal levels do not communicate directly but through bridges interconnected by a higher level bus. Also, an ordering of levels is observed in that data is filtered by their addresses before being allowed to pass through a bridge, based on the levels involved. Other hierarchical systems exist that may observe an ordering of levels by using one or more of the foregoing concepts, or by using different concepts.

Some personal computers have slots for add-on cards, which allow the card to connect to a peripheral bus in the computer. Because a user often needs additional slots, expansion cards have been designed that will connect between the peripheral bus and an external unit that offers additional slots for add-on cards. For systems for expanding a bus, see U.S. Pat. Nos. 5,006,981; 5,191,657; and 5,335,329. See also U.S. Pat. No. 5,524,252.

For portable computers, special considerations arise when the user wishes to connect additional peripheral devices. Often a user will bring a portable computer to a desktop and connect through a docking station or port replicator to a keyboard, monitor, printer or the like. A user may also wish to connect to a network through a network interface card in the docking station. At times, a user may need additional devices such as hard drives or CD-ROM drives. While technically possible to a limited extent, extending a bus from a portable computer through a cable is difficult because of the large number of wires needed and because of latencies caused by a cable of any significant length.

In order for devices to function on a bus, valid ranges for I/O and various memory accesses must be supplied, these address assignments are referred to as resources. The devices on a PCI bus contain registers in configuration space that contain this resource information. The requirements to properly assign this information is defined and detailed by the specifications contained in the PCI local bus standards from 1.0 to 2.2 as specified by the PCI Special Interest Group of Hillsboro, Oreg.

The process of locating these devices on a bus is referred to as enumeration. Of particular interest to bridges is the enumeration of the various hierarchical buses. The methods of enumeration when bridges are used may vary as long as the resulting configuration conforms to the PCI standards specification. In an effort to properly assign these resources a BIOS or operating system "OS" will test these assignments to determine if there are any conflicts or errors. In a properly designed system the resources are re-assigned correctly if an error occurs. These errors are especially prone to occur when multiple buses are employed due to the difficulties in analyzing all of the resources required by the devices at the various levels. When multiple buses are employed they are given numbers to identify them as unique buses. Obviously if a number is given to more then one bus then neither bus would be unique and conflicts can occur. The process of re-balancing is to reassign bus numbers to create a hierarchical bus number tree with all bus numbers being unique. The definitions of primary, secondary, and subordinate bus numbering and the rules governing these as used herein are contained in the PCI to PCI Bridge Architectural specification, revision 1.0, Apr. 5, 1994.

In particular, computer platforms with Windows 2000 and Windows XP Operating systems and system hardware implemented with, or expanded by a bridge resulting in, multi-level bridges are not able to rebalance PCI subsystems dynamically and do not properly assign memory and I/O resources needed by the subordinate buses. In other words, Windows 2000 and Windows do not properly support a bridge behind a bridge configuration.

Therefore, there is a need for a solution to allow for the proper configuration and resource allocation of bridges between computer bus's internal and external in desktop workstations, servers, and portable computers, that employ the Windows 2000 or Windows XP operating systems and variations thereof.

SUMMARY OF THE INVENTION

The present invention achieves technical advantages as a bridge methodology and bridge driver that configures the second hierarchical level bridges as well as supported devices to operate off a secondary run-time bus. The bridge driver overcomes the limitation of a bridge behind a bridge operating on the Microsoft Windows 2000 and Windows XP platforms, although not necessarily limited in its advantages to these Operating Systems. In addition to correcting OS limitations, the present invention achieves technical advantages by creating a truly hot-swappable PCI bus, which bus supports various types of PCI based docking and expansion devices.

Multi-level bridge configurations may occur in a variety of implementations. As additional bridges could also be added creating many levels of hierarchy the higher hierarchical level bridge will be called the parent and the bridge residing on its secondary bus will be called the Target Bridge. When expansion interfacing is accomplished through the PC Card slot, such as on portable computers, the driver of the present invention is configured as a lower filter for Parent CardBus Bridge. The driver may also be configured as an upper filter for the Target PCI Bridge operating behind the CardBus Bridge. When a host chipset like the Intel 8xx family is used this chip will also appear as a bridge to the operating system and any bridges added to its secondary bus would also create the multi-level bridge problem. In this case the driver would be configured as a lower filter to the 8XX Parent Bridge and an upper filter to the target PCI-to-PCI Bridge on its secondary bus. Drivers registered as lower filters receive PnP requests last. When the driver is registered as an upper filter, it receives PnP messages sent by the PnP manager first, and then passes them to underlining devices.

DETAILED DESCRIPTION OF THE PREFERRED EMBODIMENT

Figure 1:
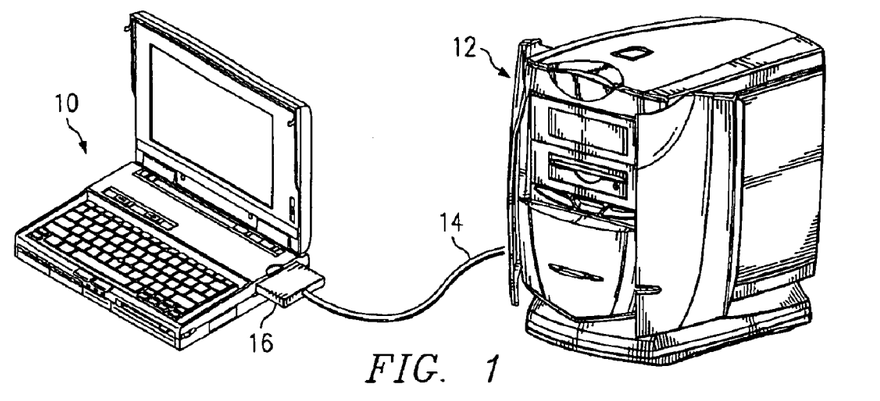
FIG. 1 is a diagram of a notebook computer having its internal PCI bus extended via a CardBus-to-PCI serial bridge link to an expansion chassis having a remote bus.

Referring to FIG. 1, there is shown one environment for the bridge driver of the present invention, shown to include a computing device such as a notebook computer 10 having an internal bus configured to communicate with a remote expansion chassis 12 having an internal bus, the two being interfaced by an extended serial link 14 capable of transferring information in a full duplex fashion. Notebook computer 10 includes a bus, such as a 32 bit or 64 bit parallel bus, and preferably including a peripheral component interconnect (PCI) bus adapted to communicate information between a plurality of associated devices including a microprocessor, memory, drives, communication ports and so forth. Expansion chassis 12 also includes a parallel bus, and may include a PCI compatible bus configured to communicate information between a plurality of associated devices that may include drives and I/O ports. Each parallel bus is adapted to transfer information through a bridge with the other, such as via a CardBus slot shown at 16 of the PC 10. For more detailed information of a host computing device adapted to communicate with a remote expansion chassis or other computing device, reference is made to commonly assigned U.S. Pat. No. 6,070,214 entitled "Serially Linked Bus Bridge for Expanding Access over a First Bus to a Second Bus", the teachings of which are incorporated herein by reference.

Figure 2:
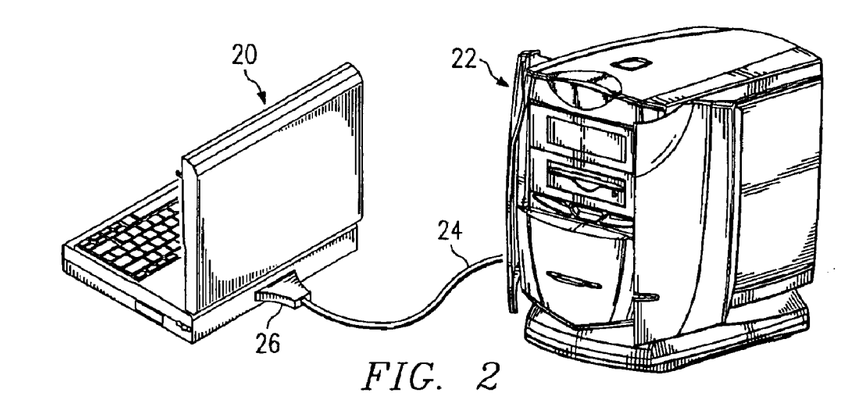
FIG. 2 is a diagram of a notebook computer having its internal PCI bus extended via a PCI-to-PCI serial bridge link to an expansion chassis having a remote bus.

Referring to FIG. 2, there is shown one environment for the bridge driver of the present invention, shown to include a computing device such as a notebook computer 20 having an internal bus configured to communicate with a remote expansion chassis 22 having an internal bus, the two being interfaced by an extended serial link 24 capable of transferring information in a full duplex fashion. Notebook computer 20 includes a Intel 8xx host chipset, a bus such as a 32 bit or 64 bit parallel bus, and preferably including a peripheral component interconnect (PCI) bus adapted to communicate information between a plurality of associated devices including a microprocessor, memory, drives, communication ports and so forth. Expansion chassis 22 also includes a parallel bus, and may include a PCI compatible bus configured to communicate information between a plurality of associated devices that may include drives and I/O ports. Each parallel bus is adapted to transfer information through a bridge with the other, such as via a docking connector shown at 26 of the PC 20. For more detailed information of a host computing device adapted to communicate with a remote expansion chassis or other computing device, reference is made to commonly assigned U.S. Pat. No. 6,070,214 entitled "Serially Linked Bus Bridge for Expanding Access over a First Bus to a Second Bus", the teachings of which are incorporated herein by reference.

Figure 3:
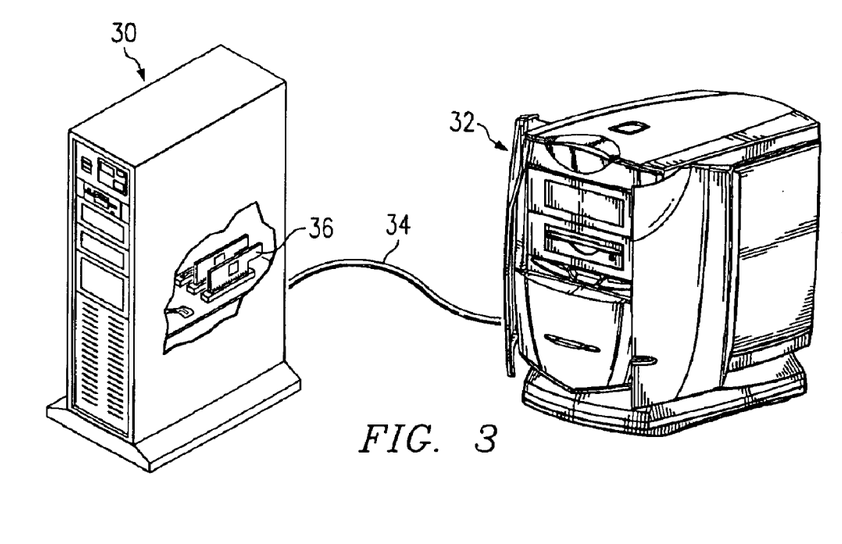
FIG. 3 is a diagram of a desktop computer or server having its internal PCI bus extended via a PCI-to-PCI serial bridge link to an expansion chassis having a remote bus.

Referring to FIG. 3, there is shown one environment for the bridge driver of the present invention, shown to include a computing device such as a desktop workstation or server computer 30 having an internal bus configured to communicate with a remote expansion chassis 32 having an internal bus, the two being interfaced by an extended serial link 34 capable of transferring information in a full duplex fashion. Notebook computer 30 includes a Intel 8xx host chipset, a bus such as a 32 bit or 64 bit parallel bus, and preferably including a peripheral component interconnect (PCI) bus adapted to communicate information between a plurality of associated devices including a microprocessor, memory, drives, communication ports and so forth. Expansion chassis 32 also includes a parallel bus, and may include a PCI compatible bus configured to communicate information between a plurality of associated devices that may include drives and I/O ports. Each parallel bus is adapted to transfer information through a bridge with the other, such as via a interface card shown at 36 of the PC 30. For more detailed information of a host computing device adapted to communicate with a remote expansion chassis or other computing device, reference is made to commonly assigned U.S. Pat. No. 6,070,214 entitled "Serially Linked Bus Bridge for Expanding Access over a First Bus to a Second Bus", the teachings of which are incorporated herein by reference.

The present invention builds upon this invention detailed in the '214 patent by providing a bridge driver adapted to support multi-level bridges on Windows 2000 and Windows XP platforms developed by Microsoft Corporation, hereafter referred to simply as Windows.

Figure 4:
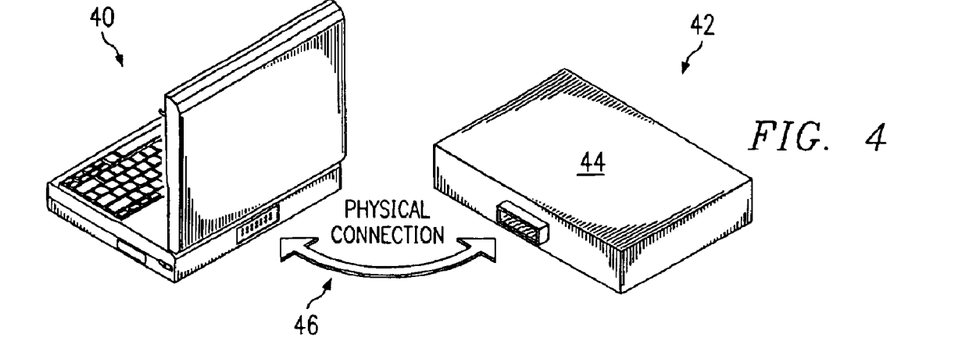
FIG. 4 is a diagram of a notebook computer having its internal PCI bus extended via a PCI-to-PCI parallel bridge link to an expansion chassis having a remote bus.

Referring to FIG. 4, there is shown one environment for the bridge driver of the present invention, shown to include a computing device such as a notebook computer 40 having an internal bus configured to communicate with a remote expansion chassis or dock 42 having an internal bus and a bridge 44, the two being interfaced by a physical parallel connection via a docking (system) connector 46 capable of transferring information in a bidirectional fashion. Notebook computer 40 includes a Intel 8xx host chipset, a bus such as a 32 bit or 64 bit parallel bus, and preferably including a peripheral component interconnect (PCI) bus adapted to communicate information between a plurality of associated devices including a microprocessor, memory, drives, communication ports and so forth. Expansion chassis 42 also includes a parallel bus, and may include a PCI compatible bus configured to communicate information between a plurality of associated devices that may include drives and I/O ports. Each parallel bus is adapted to transfer information through a bridge 44 and a docking connector shown at 46 of the PC 40 and expansion chassis 42. Note that the bridge 44 may reside on either side of the connector 46. In other words one or more bridges can be used and may reside in PC 40 and/or expansion chassis 42.

Figure 5:
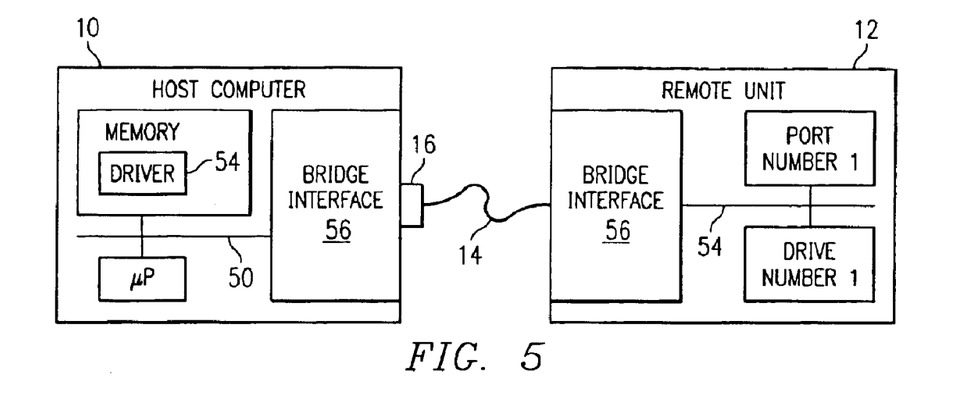
FIG. 5 is a block diagram of a multi-level bridge implementation, including a serial PCI-to-PCI and PCI-to-CardBus bridge, creating multiple PCI buses providing the expansion shown in FIG. 1.

Referring to FIG. 5, there is illustrated a block diagram of the architecture depicted in FIG. 1, illustrating the host computer 10 having a first parallel bus 50, such as a PCI bus, and the remote expansion unit 12 having a second parallel bus 52, which may also be a PCI bus, but which can also include other busses which can be configured to be compatible with bus 50 when proper software and hardware is utilized for interfacing the two together.

According to the present invention, the system consisting of host computer 10 and expansion module 12 are also seen to include a bridge driver 54 which may be adapted for use with any bridge that resides behind any other bridge creating a multi-level hierarchy. This bridge driver 54 is fully compliant with the Microsoft Corporation Windows 2000 PnP driver specification.

Figure 9:
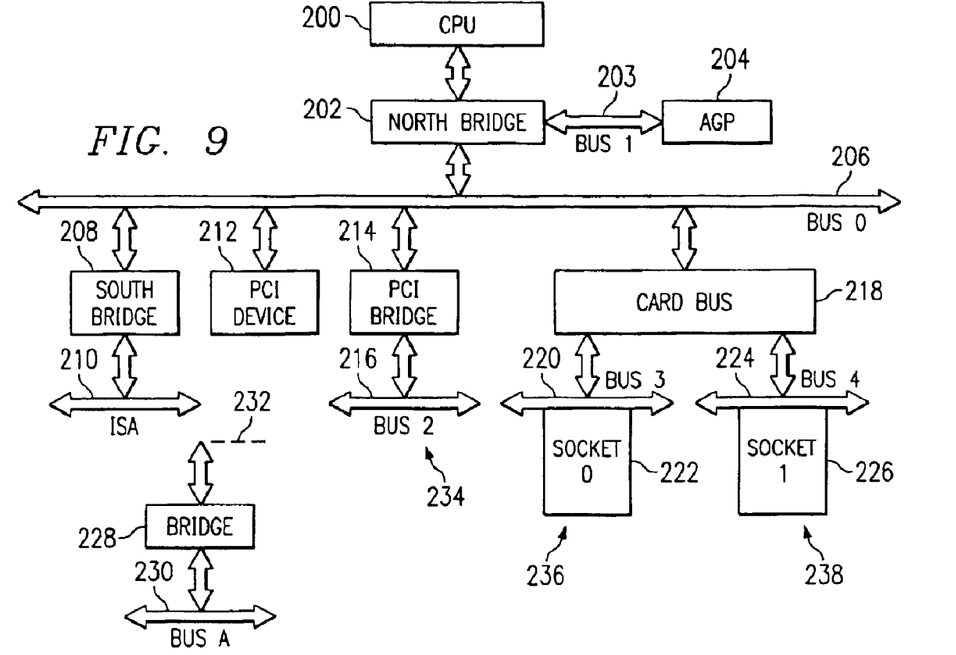
FIG. 9 is a block diagram of a computers internal PCI bus numbering where is BIOS numbered the devices from left to right, as shown on this diagram.

The purpose of driver 54 is to re-balance PCI buses and properly assign resources to Parent and Target bridges used in a multi-level configuration FIG. 9 shows one way that the BIOS could enumerate a PCI bus such as one that could be found in the systems depicted in FIGS. 1 to 4. In this example the BIOS would first encounter the PCI Bridge 214. As this bridge resides on Bus 0 the BIOS would assign to the bridge a primary number of 0. As the next bus number available after assigning a bus number of 1 to the AGP bridge 204 is 2 the BIOS would assign 2 to the secondary and subordinate bus numbers registers in the bridge. Continuing with the enumeration process the CardBus bridge 218 would get assigned secondary bus numbers of Bus 3 and Bus 4 shown at 220 and 224 respectively.

Now if a user attempted to add a bridge device 228 behind Bus 2 (216) the OS would assign to its secondary Bus number the next number available, which would be Bus 5. This bus at 230 being the last bus behind bridge 228 means that this bridges subordinate number would also be 5. However, now the subordinate number for bridge 214 will be updated to reflect the last bus number behind it. So bridge 214 will have a subordinate number of 5. This assignment will be incorrect since secondary/subordinate range (2–5) of this bridge will conflict with buses 3 and 4 located behind the CardBus bridge at 218

If however the user inserted bridge 228 into socket 1 at 226 the OS would again assign a Bus number of 5 to its secondary and subordinate Bus. In a like fashion the bridge at 218 will have its subordinate number updated to 5 yielding a secondary/subordinate range 4–5. This would not be in conflict with any other previously assigned Bus numbers and would not generate an error. In this case the OS may be able to assign resources to the bridge 228 and the devices behind it on its secondary Bus at 230.

Figure 10:
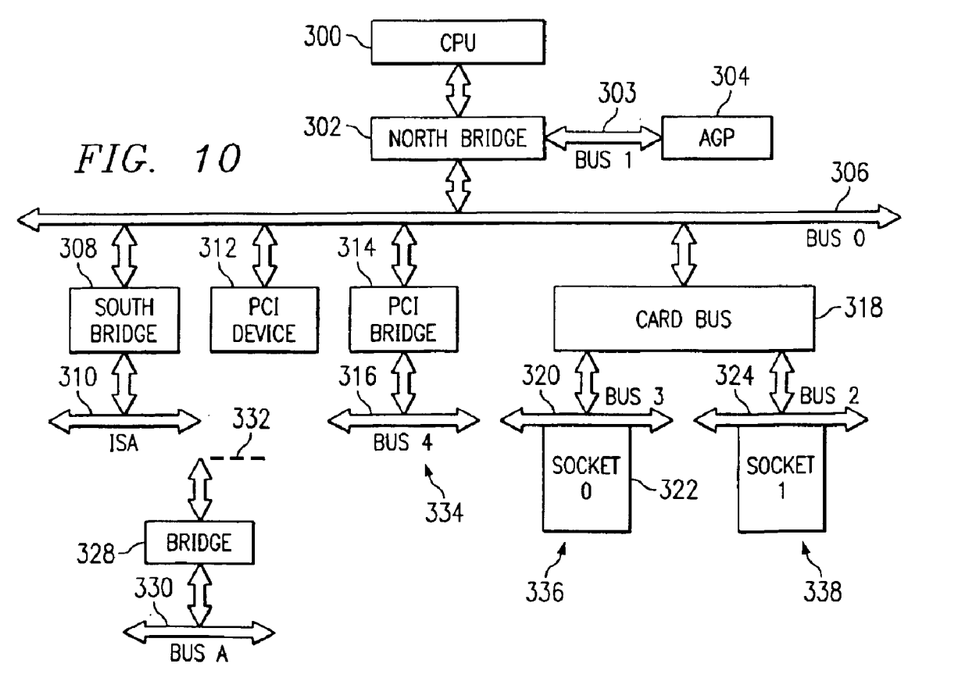
FIG. 10 is a block diagram of a computers internal PCI bus numbering where is BIOS numbered the devices from right to left, as shown on this diagram.

Repeating this example, FIG. 10 shows a system with the same physical devices. Here the OS choose to enumerate the devices from right to left. In this case attempting to add bridge 328 to either socket 0 (326) or socket 1 (322) would result in an error due to the Bus numbers conflicting with numbers previously assigned to the Buses 320 and 316 respectively. Yet this time the bridge 328 could be added to Bus 4 at 316 correctly.

Figure 11:
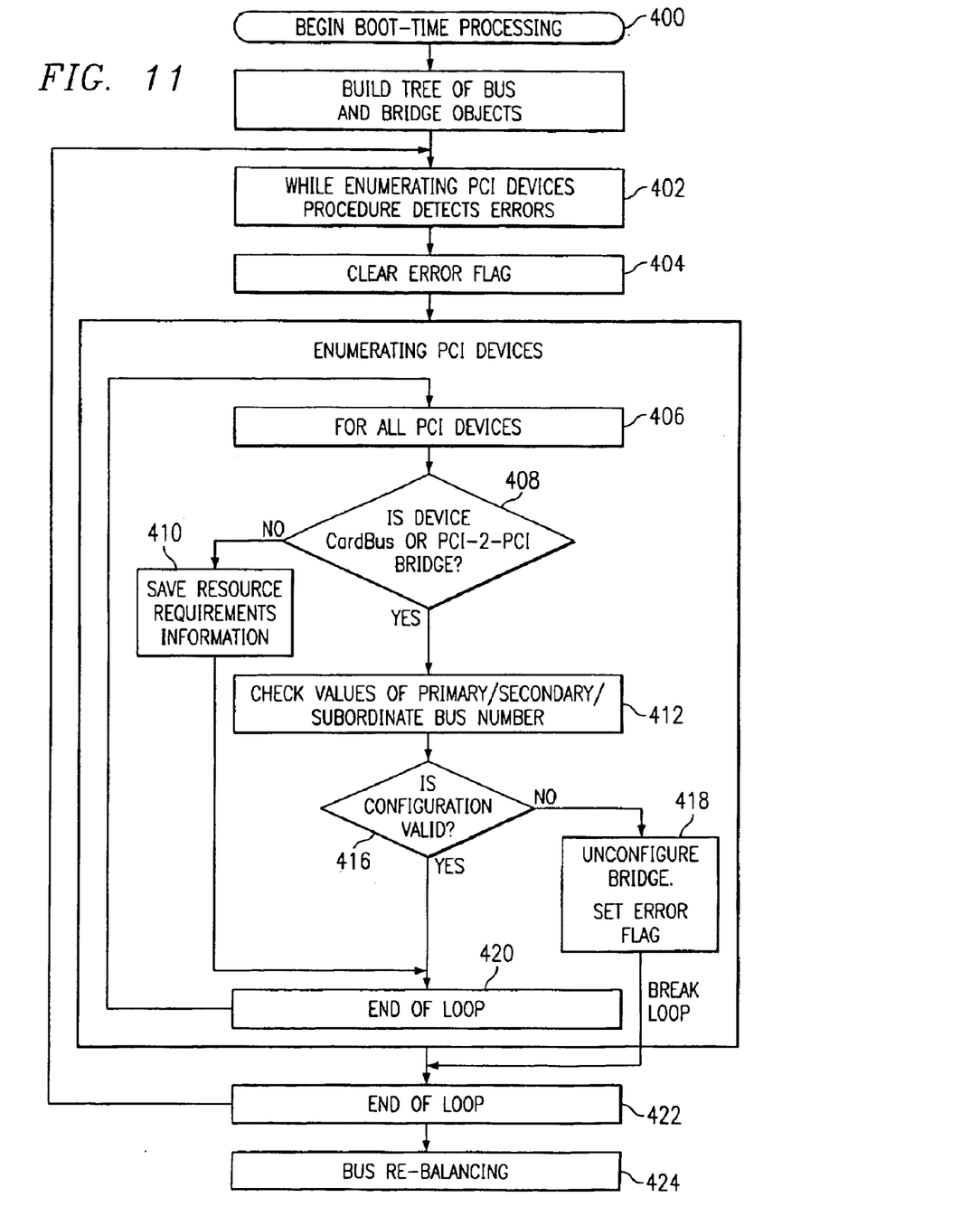
FIG. 11 depicts a software flow diagram of the building a tree of Bus and bridge objects.

In the above examples we showed the OS could either fail or in some cases properly assign the proper numbering to newly attached buses. Upon analysis it would be seen that the only location that would allow for the additional bridge would be at the end of the bus tree. In FIG. 10 the end of the tree is at 316 and in FIG. 9 it occurs at 224. It is clear that to truly support hot-swappable PCI buses behind bridges used under Windows 2000 or XP that an improvement needs to occur. FIG. 11 shows the flow diagram of the process taken by bridge driver 54 from FIG. 5 to create this enhancement. Windows loads the bridge driver 54 before loading the PCI.SYS driver but after loading the ACPI.SYS driver (if ACPI is enabled). Upon execution of this driver the buses are re-enumerated and the device type read at step 406. If at 408 the device type is a bridge the procedure at step 412 will read the bridges primary, secondary, and subordinate bus numbers that were originally assigned by the BIOS. If the bridges configuration (bus number assignments) at 416 are valid the enumeration loop will continue at 420. If all of the devices have been enumerated step 420 will end the loop. If the configuration was not valid at 416 an error flag is set at 418, bridge configuration is reset and the enumeration loop continues at 422 until all devices are enumerated. We then we proceed to step 424. At this point every bridge in the system is either configured properly or reset. The entire information about bus topology and resource requirements of non-bridge devices (410) is collected.

Figure 12:
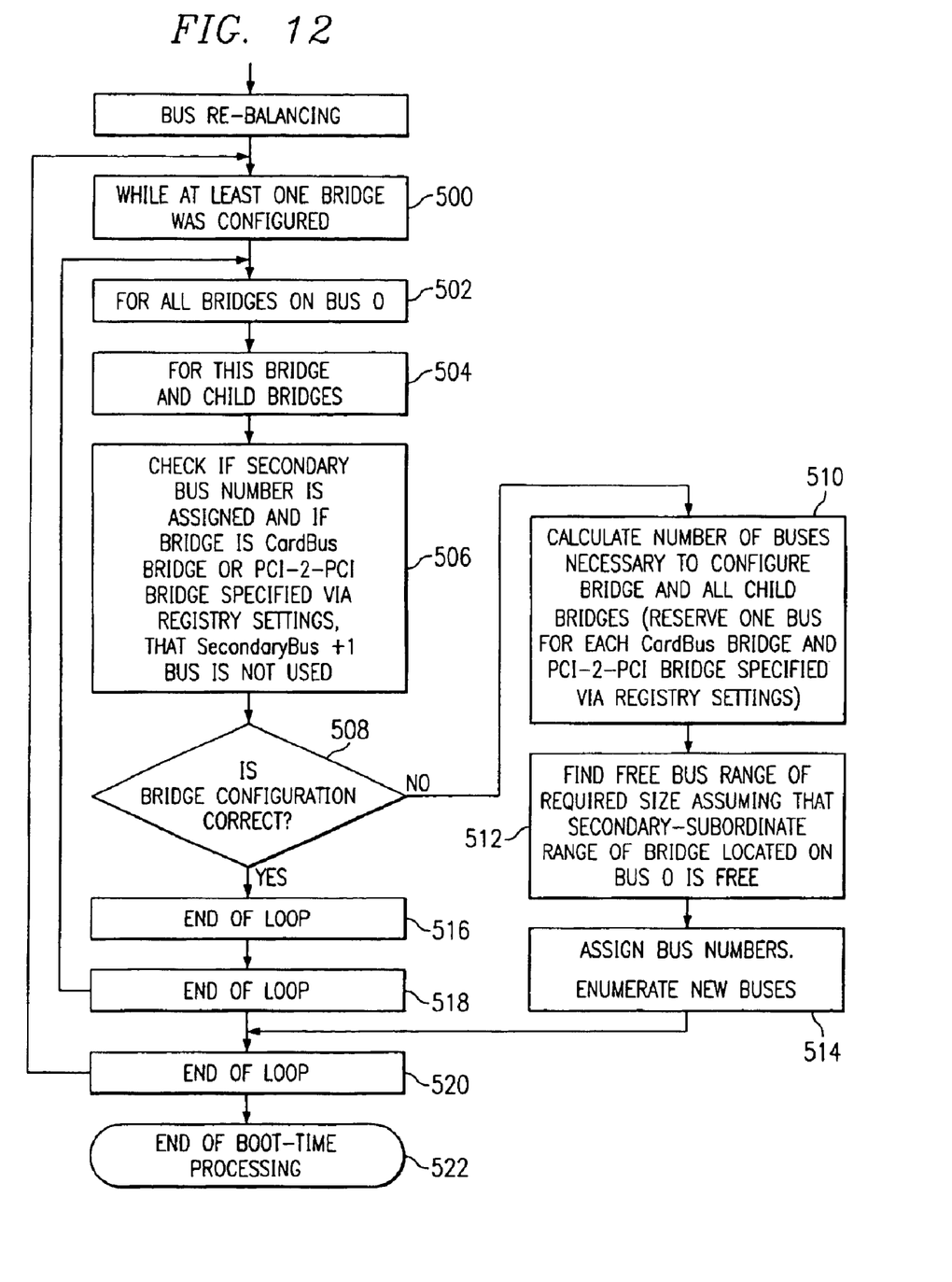
FIG. 12 depicts a software flow diagram of Bus re-balancing.

FIG. 12 details the actual re-balancing process of driver 54. At step 500 we control a loop through the devices on the primary bus while at least one of these devices is a bridge. At each bridge encountered on the primary bus at 502 and for all child of this bridge at 504 we check at 506 to see if secondary and subordinate bus numbers are assigned. During the re-enumeration described on FIG. 11 we have already tested during step 418 if the configuration assigned to the bridge device was correct. This means that secondary and subordinate bus numbers were valid, provided enough space for expansion, didn't cross with buses governed by another bridge and, if the bridges primary bus number was not 0, fit into secondary-subordinate range of the upper level bridge. If all these conditions were met the bridge was configured properly. If one of above conditions was wrong, the bridge was unconfigured (secondary and subordinate bus numbers were reset to 0 and enumeration described in FIG. 11 was restarted from the beginning until at the end of this process loop 402/422 any improperly configured bridges will have been reset.

So in FIG. 12 at step 506 any bridge that is without proper configuration will be detected by their secondary and subordinate bus numbers being 0. If the configuration isn't correct at step 508 we would proceed to step 510, otherwise we continue the loop at 518. At step 510 we determine how many buses are needed by this parent bridge and its children allowing for an additional bus for each bridge to permit hot buses creation. At step 512 we find a range of bus numbers that will allow this parent bridge and all its children to fit. These bus numbers are assigned and these new buses are enumerated at 514. We continue this process until all bridges on PCI Bus 0 are processed. At the completion of this loop we exit the rebalancing procedure at step 522.

Figure 13:
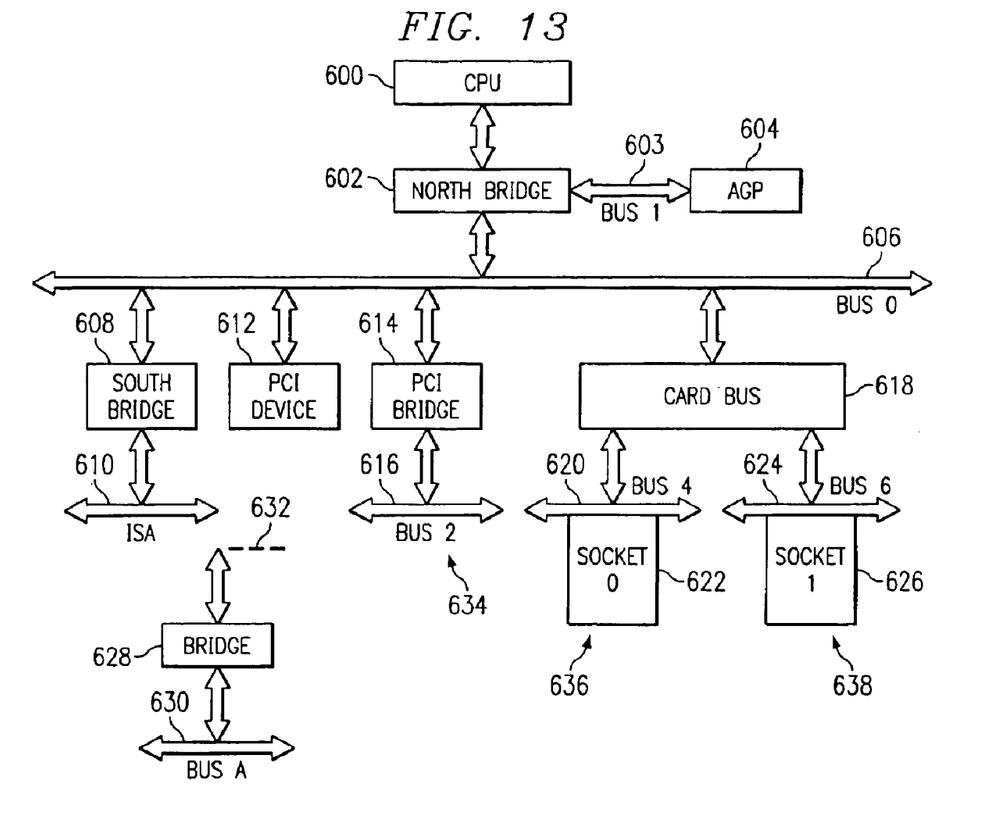
FIG. 13 is diagram of a computers internal PCI bus numbering before after modified by the software driver in a system employing multiple hierarchical bridges or allowing for hot swappable PCI or other buses.

FIG. 13 now shows the original system depicted in FIG. 9 after the bus has been correctly re-balanced by driver 54. Now Bridge 628 can correctly be added to Bus 2 at 616, or Bus 4 at 620, or Bus 6 at 624 without generating an error. After appropriate re-balancing driver 54 returns control to Windows OS which continue the boot process. Sometimes later in boot process Windows will load PCI.SYS and PCMCIA.SYS drivers, enumerates PCI and CardBus devices and attempt to assign resources to all bridges.

Figure 6:
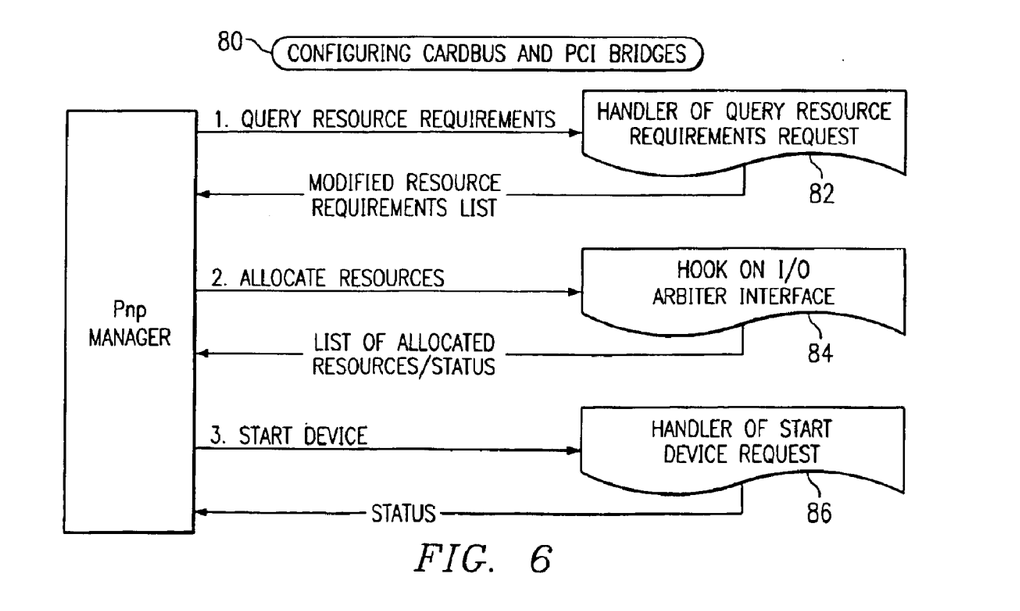
FIG. 6 depicts is a flow diagram of the configuring process of CardBus and PCI bridges.

FIG. 6 shows the process that Windows performs during resource allocation. As shown in step 80 the same driver is registered as the lower filter for the Parent Bridge and upper filter for the Target Bridge.

Step 82 shows that before any request from the PnP manager for resource allocation are passed to the OS Kernel our driver is called.

Figure 7:
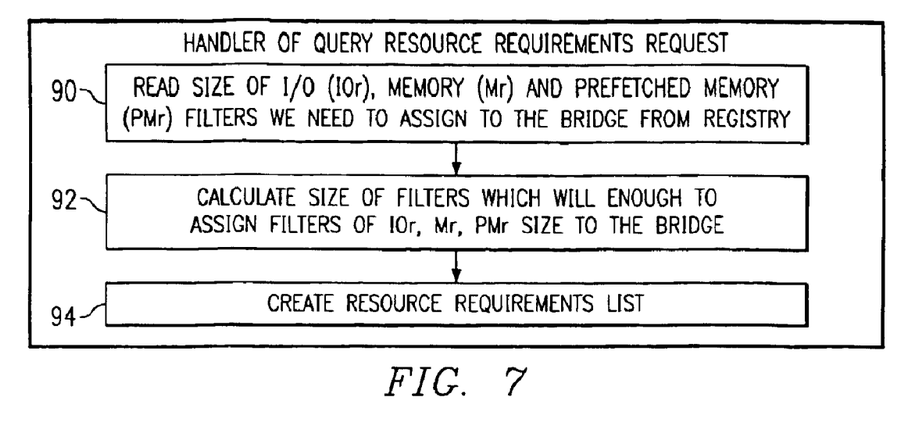
FIG. 7 depicts is a software flow diagram of the handler for resource requirements.

FIG. 7 expands on the actions taken at step 82. In step 90 the PnP manager submits a list of resources to driver 54 who then has a chance to modify this list. In step 92 the driver will calculate the filter (size of the window) needed for memory, prefetch memory, and I/O for the Bridge. In this step the procedure will both look at the registry settings and also calculate the resource requirements for any devices behind the Target Bridge. In step 94 the driver will create a modified list of the resources and pass this modified list back to the PnP manager.

FIG. 6, step 84 shows that the PnP manager then tries to allocate resources. The PnP manager is passing the resource list to the OS kernel who pre-filters and breaks the large list of requirements into a series of individual resource ranges. Those individual ranges are passed to the Arbitrator API. The API checks if such range would conflict with already allocated resources kept by individual arbitrators.

Figure 8:
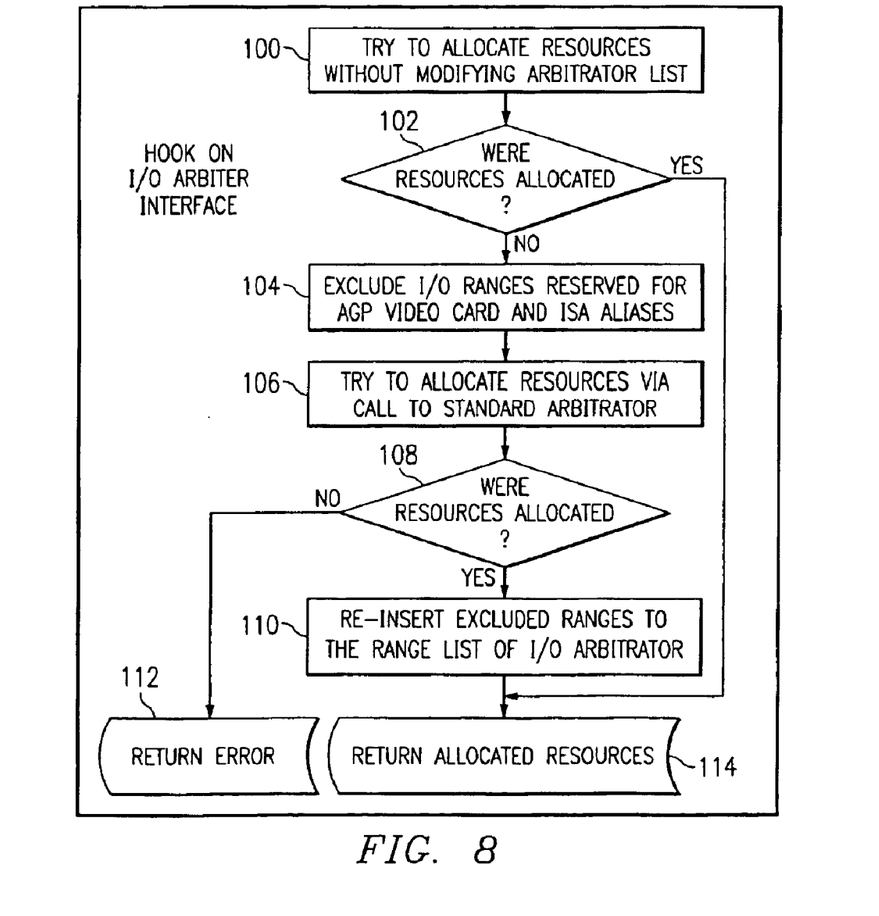
FIG. 8 depicts a software flow diagram of hooking the I/O arbiter interface.

FIG. 8 shows how Driver 54 hooks this process. In step 100 the resources that the OS kernel wants to allocate are passed to the Arbitrator API. If these requirements are acceptable to all arbitrators no error will be in 102 and the Arbitrator API will return in 114. If the Arbitrator API returns an error indicating that the resources are not acceptable in 102, then driver 54 will query the individual arbitrators about resource ranges they are keeping. After going through the list of resources returned by this query the procedure will analyze stored resource list, determine what are the physical resources and remove from the list virtual resources introduced from the older I/O legacy alliasing and from AGP in step 104. After this the Arbitrator API is called again checking if new resource range still conflict with modified resource list. Step 108 checks to see if this occurred. If not it means the system would not assign the correct resources and an error is returned at 112. If the system did assign the correct resources the the code returns success at 114. The original list of resources hold by individual arbitrators is restored before return.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. A bridge driver adapted to permit communication from a first communication bus to a second communication bus via a bridge, the bridge driver being adapted to rebalance a multi-level PCI bridge based computer system.

2. The bridge driver as specified in claim 1 wherein the first communication bus supports an Intel 8XX chipset.

3. The bridge driver as specified in claim 1 wherein the first communication bus is a PCI bus.

4. The bridge driver as specified in claim 3 wherein the second communication bus is a PCI bus.

5. The bridge driver as specified in claim 1 wherein the bus driver is configured as a lower filter when utilized with a PCMCIA type socket.

6. The bridge driver as specified in claim 5 wherein the bridge driver is adapted to receive PnP requests last from a PnP manager.

7. The bridge driver as specified in claim 1 wherein the bus driver is configured as an upper filter when utilized with a PCI-PCI bridge.

8. The bridge driver as specified in claim 1 wherein the bus driver is configured as a lower filter when utilized with a PCI-PCI bridge having negative decoding.

9. The bridge driver as specified in claim 1 wherein the bus driver is configured as an upper filter and receives PnP messages sent by a PnP manager first, and then passes them to a target bridge.

10. The bridge driver as specified in claim 1 wherein the bridge driver operates, even when receiving interrupts sent by a PCMCIA type socket.

11. The bridge driver as specified in claim 1 wherein the bridge driver operates off a secondary bus run-time of the second communication bus.

12. The bridge driver as specified in claim 1 wherein the bridge driver is hot-swappable.

* * * * *